United States Patent
Guan et al.

(10) Patent No.: US 12,088,136 B2
(45) Date of Patent: Sep. 10, 2024

(54) CHARGING METHOD, ELECTRONIC APPARATUS, AND STORAGE MEDIUM

(71) Applicant: Ningde Amperex Technology Limited, Ningde (CN)

(72) Inventors: Ting Guan, Ningde (CN); Shan Zhu, Ningde (CN); Fei Wu, Ningde (CN)

(73) Assignee: Ningde Amperex Technology Limited, Ningde (CN)

( * ) Notice: Subject to any disclaimer, the term of this patent is extended or adjusted under 35 U.S.C. 154(b) by 763 days.

(21) Appl. No.: 17/281,355

(22) PCT Filed: Oct. 21, 2019

(86) PCT No.: PCT/CN2019/112386
§ 371 (c)(1),
(2) Date: Mar. 30, 2021

(87) PCT Pub. No.: WO2021/077273
PCT Pub. Date: Apr. 29, 2021

(65) Prior Publication Data
US 2021/0391742 A1   Dec. 16, 2021

(51) Int. Cl.
*H02J 7/00* (2006.01)
*H01M 10/44* (2006.01)
*H01M 10/48* (2006.01)

(52) U.S. Cl.
CPC ....... *H02J 7/007182* (2020.01); *H01M 10/44* (2013.01); *H01M 10/48* (2013.01); *H02J 7/0049* (2020.01); *H02J 7/00714* (2020.01)

(58) Field of Classification Search
CPC ............ H02J 7/007182; H02J 7/00714; H02J 7/0049; H01M 10/44; H01M 10/48
(Continued)

(56) References Cited

U.S. PATENT DOCUMENTS 11,789,083 B2 * 10/2023 Wei .................... G01R 31/3835
                                                             702/63
2011/0169459 A1   7/2011 Chen et al.
(Continued)

FOREIGN PATENT DOCUMENTS

CN    103872398 A    6/2014
CN    105098876 A    11/2015
(Continued)

OTHER PUBLICATIONS

Office Action issued on Jun. 8, 2023, in corresponding Chinese Application No. 201980058975.0, 12 pages.
(Continued)

*Primary Examiner* — Suresh Memula
(74) *Attorney, Agent, or Firm* — Maier & Maier, PLLC (57) ABSTRACT

A method of charging a battery, including: in an $m^{th}$ charge and discharge cycle, constant-current charging a battery to a first cut-off voltage $U_m$ at a charging current, where m is any two or more integers of 1, 2, 3, . . . , x, and $U_m$ has different values in at least two charge and discharge cycles. The method shortens fully charged time of a battery and further ensure that phenomena of lithium precipitation and overcharge do not occur on the battery, thereby prolonging a service life of the battery.

18 Claims, 4 Drawing Sheets

---

S21

Constant-current charge a battery to a first cut-off voltage at a charging current in an $m^{th}$ charge and discharge circle

↓

S22

Constant-voltage charge the battery to a fully charged status by using the first cut-off voltage (58) Field of Classification Search
USPC .......................................................... 320/132
See application file for complete search history.

(56) References Cited

U.S. PATENT DOCUMENTS

| | | | | |
|---|---|---|---|---|
| 2011/0236751 A1* | 9/2011 | Amiruddin | ......... | H01M 4/0447 |
| | | | | 429/188 |
| 2013/0141109 A1* | 6/2013 | Love | .................... | G01R 31/389 |
| | | | | 324/430 |
| 2017/0366015 A1 | 12/2017 | Luo et al. | | |
| 2019/0190060 A1* | 6/2019 | Chevrier | ............. | H01M 10/058 |
| 2021/0135294 A1* | 5/2021 | Mikhaylik | ............ | H02J 7/0069 |
| 2022/0069593 A1* | 3/2022 | Hamblin | ............... | H02J 7/0019 |
| 2022/0190623 A1* | 6/2022 | Fu | ...................... | H01M 10/425 |
| 2022/0271537 A1* | 8/2022 | Mikhaylik | ............ | H02J 7/0068 |
| 2023/0336007 A1* | 10/2023 | Khoshkbar-Sadigh | ...................... | |
| | | | | H02J 7/0047 |

FOREIGN PATENT DOCUMENTS

| | | | | |
|---|---|---|---|---|
| CN | 103107378 B | | 8/2016 | |
| CN | 105870525 A | | 8/2016 | |
| CN | 105958588 A | | 9/2016 | |
| CN | 106451640 A | * | 2/2017 | |
| CN | 107134821 A | | 9/2017 | |
| CN | 110085934 A | | 8/2019 | |
| CN | 110176795 A | | 8/2019 | |
| EP | 4274052 A1 | * | 11/2023 | ........... G01R 31/392 |
| WO | WO-2017192425 A1 | * | 11/2017 | .......... H01M 10/052 |
| WO | 2018045920 A1 | | 3/2018 | |
| WO | WO-2022185152 A1 | * | 9/2022 | |

OTHER PUBLICATIONS

Office Action issued on Sep. 3, 2023, in corresponding Chinese Application No. 201980058975.0, 8 pages.

Office Action issued on May 24, 2023, in corresponding Indian Application No. 202117015364, 7 pages.

International Search Report and Written Opinion of the International Searching Authority issued on Jul. 21, 2020 in corresponding International application No. PCT/CN2019/112386; 10 pages.

* cited by examiner

CHARGING METHOD, ELECTRONIC APPARATUS, AND STORAGE MEDIUM

CROSS-REFERENCE TO RELATED APPLICATIONS

This application is a national phase entry of International Application No. PCT/CN2019/112386, filed on Oct. 21, 2019 and entitled "CHARGING METHOD, ELECTRONIC APPARATUS, AND STORAGE MEDIUM", which is incorporated herein by reference in its entirety.

TECHNICAL FIELD

This application relates to the field of battery technologies, and in particular, to a method of charging a battery, an electronic apparatus, and a storage medium.

BACKGROUND

Currently, a charging method commonly used for a lithium-ion battery is continuously charging the lithium-ion battery to a specific voltage (for example, a charging limit voltage) with a preset constant current, and then constant-voltage charging the lithium-ion battery to a fully charged state at the voltage. In this case, as a quantity of charging cycles and use time of the battery increase, impedance of the battery increases, and consequently, constant-current charging time of the battery is shortened and constant-voltage charging time is prolonged, thereby leading to increasingly long total charging time of the battery.

SUMMARY

In view of this, a charging method, an electronic apparatus, and a storage medium need to be provided to shorten fully charged time of a battery and further ensure that phenomena of lithium precipitation and overcharge do not occur on the battery.

An implementation of this application provides a method of charging a battery, where the charging method includes: in an $m^{th}$ charge and discharge cycle, constant-current charging a battery to a first cut-off voltage $U_m$ at a charging current, where m is any two or more integers of 1, 2, 3, ..., x, m is an integer greater than 2, and $U_m$ has different values in at least two charge and discharge cycles.

Based on some implementations of this application, $U_m=U_{c1}+b$, $0<b\le0.5$, $U_{c1}$ is a second cut-off voltage, $U_{c1}$ is a cut-off voltage of the battery or another battery the same as the battery when a constant-current charging stage in an $n^{th}$ charge and discharge cycle ends, or $U_{c1}$ is a charging limit voltage of the battery or the another battery or a preset value, n is an integer greater than or equal to 0, and b has different values in at least two charge and discharge cycles.

Based on some implementations of this application, $b=b_1\times m+b_2$, $0\le b_1\le 0.0005$, and $0\le b_2\le 0.1$.

Based on some implementations of this application, the first cut-off voltage $U_m$ may be further obtained in the following manner: selecting a larger one of the second cut-off voltage $U_{c1}$ and a third cut-off voltage U as the first cut-off voltage $U_m$, where the third cut-off voltage satisfies that $U=OCV_1+(U_{c1}-OCV_1)\times k$, $OCV_1$ is an open-circuit voltage of the battery or another battery when a constant-current charging stage in an $n^{th}$ charge and discharge cycle ends, and k is an impedance growth rate of the battery or the another battery.

Based on some implementations of this application, the open-circuit voltage $OCV_1$ and the second cut-off voltage $U_{c1}$ may be obtained through the following steps: obtaining a correspondence between an open-circuit voltage and a state of charge of the battery and a correspondence between a voltage and a state of charge of the battery; and based on the correspondence between the open-circuit voltage and the state of charge of the battery and the correspondence between the voltage and the state of charge of the battery, obtaining the open-circuit voltage $OCV_1$ and the second cut-off voltage $U_{c1}$ of the battery when the constant-current charging stage in the $n^{th}$ charge and discharge cycle ends.

Based on some implementations of this application, the impedance growth rate k is obtained through the following steps: obtaining first battery impedance $R_1$ of the battery in the $n^{th}$ charge and discharge cycle; and obtaining second battery impedance $R_2$ of the battery in an $(m-1)^{th}$ charge and discharge cycle, where $k=R_2/R_1$.

Based on some implementations of this application, the charging method further includes: comparing magnitude of a first state of charge $SOC_1$ and that of a second state of charge $SOC_2$; wherein the $SOC_1$ is a state of charge of the battery when a constant-current charging stage in an $n^{th}$ charge and discharge cycle ends, and the $SOC_2$ is a state of charge of the battery before the $m^{th}$ charge and discharge cycle.

Based on some implementations of this application, the charging method further includes: in the $m^{th}$ charge and discharge cycle, when the second state of charge $SOC_2$ is greater than or equal to the first state of charge $SOC_1$, constant-voltage charging the battery based on the first cut-off voltage $U_m$ and a first charging capacity $Q_1$, where $Q_1=(1-SOC_2)\times Q$, and Q is a current actual capacity of the battery.

Based on some implementations of this application, the charging method further includes: in the $m^{th}$ charge and discharge cycle, when the second state of charge $SOC_2$ is greater than or equal to the first state of charge $SOC_1$, obtaining a fourth cut-off voltage of the battery in a constant-voltage charging stage in an $(m-1)^{th}$ charge and discharge cycle; and constant-voltage charging the battery based on the fourth cut-off voltage and a first charging capacity $Q_1$, where $Q_1=(1-SOC_2)\times Q$, and Q represents a current actual capacity of the battery.

Based on some implementations of this application, the charging method further includes: in the $m^{th}$ charge and discharge cycle, when the second state of charge $SOC_2$ is less than the first state of charge $SOC_1$, constant-current charging the battery to the first cut-off voltage $U_m$ at the charging current, where the charging current is a charging current of the battery or another battery same as the battery in the constant-current charging stage in the $n^{th}$ charge and discharge cycle, or the charging current is a preset value; and constant-voltage charging the battery to a fully charged state at the first cut-off voltage $U_m$, wherein a total charging capacity of the battery reaching the fully charged state is a second charging capacity $Q_2$, where $Q_2=(1-SOC_2)\times Q$, and Q is a current actual capacity of the battery.

An implementation of this application further provides an electronic apparatus, including: a battery; and a processor, configured to perform the foregoing method of charging a battery.

An implementation of this application further provides a storage medium, storing at least one computer instruction, where the computer instruction is loaded by a processor and is used to perform the foregoing method of charging a battery.

Based on the method of charging a battery, the electronic apparatus, and the storage medium provided in the implementations of this application, the first cut-off voltage of the battery in the constant-current charging stage in each charge and discharge cycle is increased, to increase the constant-current charging time of the battery and shorten the constant-voltage charging time of the battery, which can further shorten the fully charged time (or the total charging time) of the battery; and the charging of the battery in the constant-voltage stage is ended through the capacity, which can ensure that phenomena of lithium precipitation and overcharge do not occur on the battery.

REFERENCE SIGNS OF MAIN COMPONENTS

| | |
|---|---|
| Electronic apparatus | 100 |
| Charging system | 10 |
| Processor | 11 |
| Battery | 13 |
| Obtaining module | 101 |
| Comparison module | 102 |
| Determining module | 103 |
| Charging module | 104 |

This application is further described in detail in the following specific implementations with reference to the accompanying drawings.

DESCRIPTION OF EMBODIMENTS

The following clearly describes the technical solutions in the implementations of this application with reference to the accompanying drawings in the implementations of this application. Apparently, the described implementations are some but not all of the implementations of this application. All other implementations obtained by a person of ordinary skill in the art based on the implementations of this application without creative efforts shall fall within the protection scope of this application.

Figure 1:
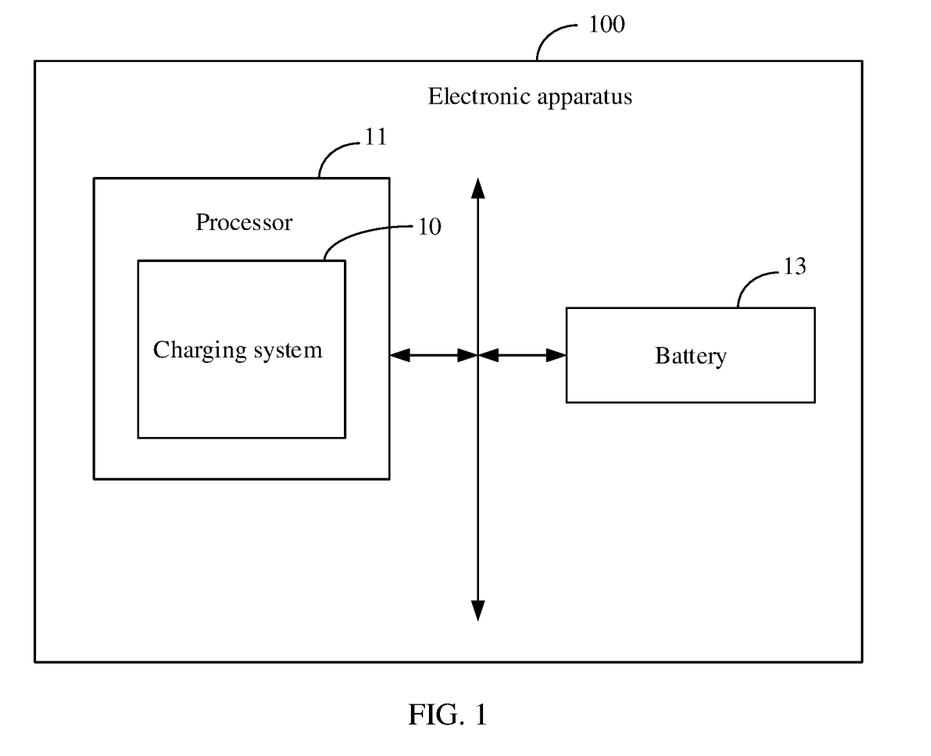
FIG. 1 is a schematic structural diagram of an electronic apparatus according to an implementation of this application.

Referring to FIG. 1, a charging system 10 runs in an electronic apparatus 100. The electronic apparatus 100 includes, but is not limited to, at least one processor 11 and a battery 13. The elements can be connected through a bus or directly connected.

It should be noted that the electronic apparatus 100 is used only as an example for description in FIG. 1. In another implementation, the electronic apparatus 100 may alternatively include more or fewer elements, or have a different element configuration.

The electronic apparatus 100 may be an electric motorcycle, an electric bicycle, an electric car, a mobile phone, a tablet computer, a personal digital assistant, a personal computer, or any other appropriate rechargeable device.

In an implementation, the battery 13 is a rechargeable battery for supplying power to the electronic apparatus 100. For example, the battery 13 may be a lead-acid battery, a nickel-cadmium battery, a nickel-hydrogen battery, a lithium-ion battery, a lithium polymer battery, a lithium iron phosphate battery, or the like. The battery 13 is logically connected to the processor 11 through the charging system 10, so that functions such as charge, discharge, and power consumption management are implemented by using the charging system 10. The battery 13 includes a battery core (not shown in the figure).

Figure 2:
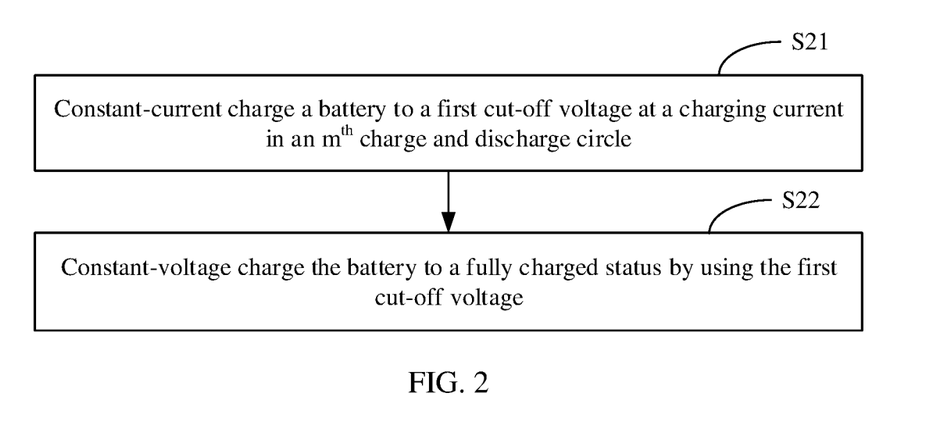
FIG. 2 is a flowchart of a method of charging a battery according to an implementation of this application.

FIG. 2 is a flowchart of a method of charging a battery according to an implementation of this application.

The method of charging a battery may include the following steps.

Step S21: Constant-current charge a battery to a first cut-off voltage $U_m$ at a charging current in an $m^{th}$ charge and discharge cycle.

In an implementation, the charging system 10 constant-current charges the battery 13 to the first cut-off voltage $U_m$ by using the charging current in the $m^{th}$ charge and discharge cycle, where m is any two or more integers of 1, 2, 3, ..., x, m is an integer greater than 2, and $U_m$ has different values in at least two charge and discharge cycles. That is, in the at least two charge and discharge cycles, first cut-off voltages $U_m$ of the battery in constant-current charging stages are different.

Step S22: Constant-voltage charge the battery to a fully charged state by using the first cut-off voltage $U_m$.

Specifically, when the charging system 10 constant-current charges the battery 13 to the first cut-off voltage $U_m$ at the charging current in the $m^{th}$ charge and discharge cycle, the charging system 10 constant-voltage charges the battery 13 to the fully charged state at the first cut-off voltage $U_m$, to ensure that lithium precipitation does not occur on the battery 13 and an overcharge phenomenon does not occur on the battery.

In an implementation, the first cut-off voltage $U_m$ may satisfy the following formula:

$$U_m = U_{c1} + b \qquad (1).$$

$0 < b \le 0.5$, b can vary with a quantity of charge and discharge cycles of the battery, and $U_{c1}$ is a second cut-off voltage. That is, $U_{c1}$ is a cut-off voltage of the battery 13 or another battery the same as the battery when a constant-current charging stage in an $n^{th}$ charge and discharge cycle ends, or $U_{c1}$ is a charging limit voltage of the battery or the another battery (the charging limit voltage in the Background or a charging limit voltage indicated by battery product information), or $U_{c1}$ is a preset value.

Herein, n is an integer greater than or equal to 0, m is greater than n, and b has different values in at least two charge and discharge cycles. That is, in the at least two charge and discharge cycles, first cut-off voltages $U_m$ of the battery in constant-current charging stages are different.

In an implementation, b satisfies the following formula:

$$b = b_1 \times m + b_2 \qquad (2).$$

Herein, $0 \le b_1 \le 0.0005$, and $0 \le b_2 \le 0.1$. The formula (2) indicates that a value of b can vary with a quantity m of cycles. That is, in different charge and discharge cycles, values of b may be the same or different.

Figure 3:
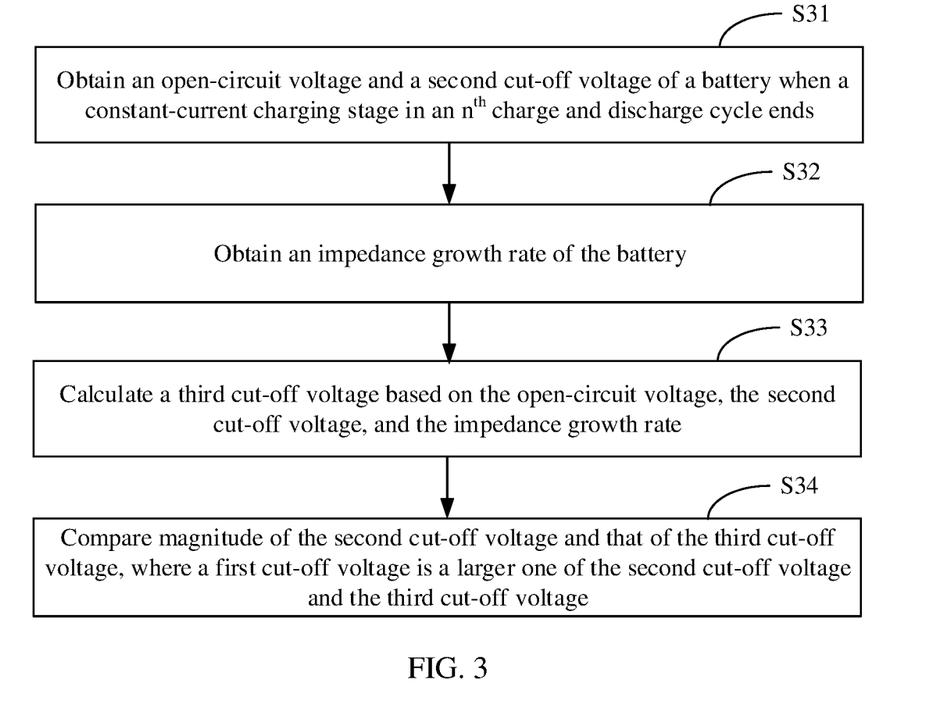
FIG. 3 is a flowchart of a method of charging a battery according to another implementation of this application.

In another implementation, referring to FIG. 3, the charging system 10 may also determine the first cut-off voltage $U_m$ of the battery 13 in the $m^{th}$ charge and discharge cycle through the following specific steps.

Step S31: Obtain an open-circuit voltage $OCV_1$ and a second cut-off voltage $U_{c1}$ of the battery when a constant-current charging stage in an $n^{th}$ charge and discharge cycle ends.

In an implementation, the charging system 10 obtains the open-circuit voltage $OCV_1$ and the second cut-off voltage $U_{c1}$ of the battery when the constant-current charging stage in the $n^{th}$ charge and discharge cycle ends.

Specifically, the charging system 10 stores or obtains a correspondence between an open-circuit voltage and a state of charge (SOC) of the battery 13 and a correspondence between a voltage and a state of charge of the battery. The SOC refers to a ratio of a remaining capacity of the battery to a fully charged capacity of the battery.

Further, based on the correspondence between the open-circuit voltage and the state of charge of the battery 13 and the correspondence between the voltage and the state of charge of the battery, the charging system 10 further obtains open-circuit voltages $OCV_1$ of the battery 13 at different temperatures when the constant-current charging stage ends, and second cut-off voltages $U_{c1}$ at different temperatures when the constant-current charging stage ends in the $n^{th}$ charge and discharge cycle.

That is, based on the foregoing two correspondence and an ambient temperature before the battery is charged in the $m^{th}$ charge and discharge cycle, the charging system 10 obtains the open-circuit voltage $OCV_1$ and the second cut-off voltage $U_{c1}$ of the battery 13 at the ambient temperature in the $n^{th}$ charge and discharge cycle.

The correspondence between the open-circuit voltage and the state of charge of the battery 13 is a mapping relationship established in advance between an open-circuit voltage and a state of charge of the battery 13 that are collected before the battery is charged. The correspondence between the battery voltage and the state of charge of the battery 13 is a mapping relationship established in advance between a voltage and a state of charge of the battery 13 that are collected before the battery is charged.

Therefore, the open-circuit voltages $OCV_1$ and the second cut-off voltages $U_{c1}$ of the battery at the different temperatures when the constant-current charging stage ends may be obtained. The charging system 10 may also pre-store the open-circuit voltages $OCV_1$ and the second cut-off voltages $U_{c1}$ of the battery 13 at the different temperatures when the constant-current charging stage ends.

Step S32: Obtain an impedance growth rate k of the battery 13.

Specifically, in this implementation, the charging system 10 obtains battery impedance of the battery 13 at different temperatures in the $n^{th}$ charge and discharge cycle, and the battery impedance is denoted as first battery impedance $R_1$.

Therefore, the charging system 10 may obtain battery impedance of the battery in different states of charge at different temperatures.

In this implementation, the charging system 10 may further obtain battery impedance of the battery 13 in an $(m-1)^{th}$ charge and discharge cycle, and the battery impedance is denoted as second battery impedance $R_2$.

The charging system 10 may determine the impedance growth rate of the battery 13 based on the first battery impedance $R_1$ and the second battery impedance $R_2$ in the same state of charge.

Specifically, the charging system 10 obtains the first battery impedance $R_1$ and the second battery impedance $R_2$ at the same temperature and state of charge, to determine the impedance growth rate of the battery 13.

$R_1$ and $R_2$ may be battery impedance of the battery in the same state of charge during discharging, or battery impedance of the battery in the same state of charge during charging.

In this implementation, the impedance growth rate of the battery 13 is denoted as k, and k satisfies the following formula:

$$k = R_2/R_1 \qquad (3).$$

Step S33: Calculate a third cut-off voltage U based on the open-circuit voltage $OCV_1$, the second cut-off voltage $U_{c1}$, and the impedance growth rate k.

Specifically, the third cut-off voltage U satisfies the following formula:

$$U = OCV_1 + (U_{c1} - OCV_1) \times k \qquad (4).$$

Herein, the $OCV_1$ is the open-circuit voltage of the battery 13 when the constant-current charging stage in the $n^{th}$ charge and discharge cycle ends, and k is the impedance growth rate of the battery 13.

Step S34: The first cut-off voltage $U_m$ is a larger one of the second cut-off voltage $U_{c1}$ and the third cut-off voltage U.

In an implementation, the charging system 10 compares magnitude of the second cut-off voltage $U_{c1}$ and that of the third cut-off voltage U, and uses a larger one of the second cut-off voltage $U_{c1}$ and the third cut-off voltage U as the first cut-off voltage $U_m$.

Figure 4:
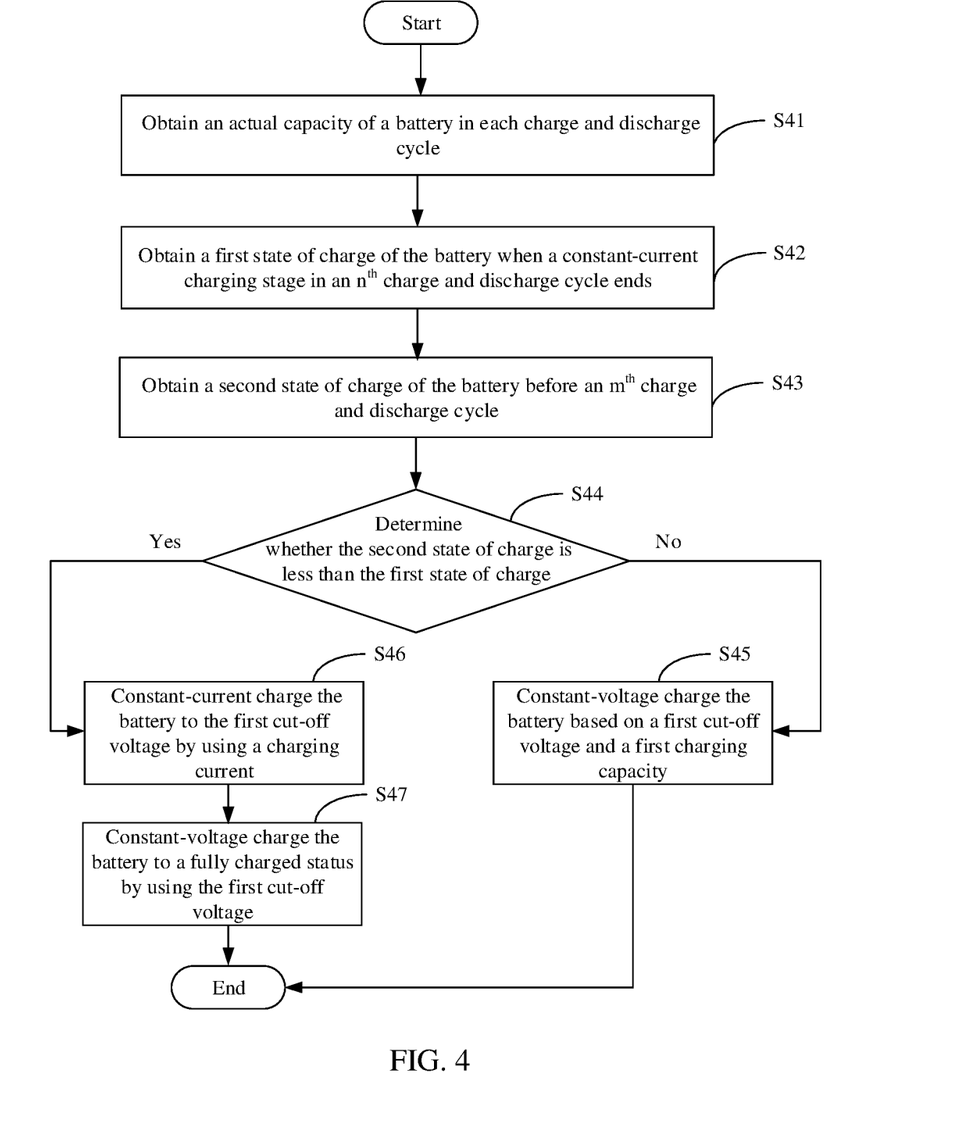
FIG. 4 is a flowchart of a method of charging a battery according to still another implementation of this application.

In an implementation, referring to FIG. 4, to constant-current charge the battery to the first cut-off voltage $U_m$ by using the charging current, the charging system 10 may specifically perform the following steps.

Step S41: Obtain an actual capacity of the battery 13 in each charge and discharge cycle.

In this implementation, the actual capacity of the battery 13 in each charge and discharge cycle is an actual battery capacity of the battery 13 in the corresponding charge and discharge cycle, that is, a maximum capacity of the battery 13 in each cycle that is obtained by discharging the battery 13 from a fully charged state to a fully discharged state. A discharging capacity may be measured by using a coulometer.

In this implementation, the fully discharged state indicates that after the battery is discharged, a battery level of the battery is 0.

In another implementation, the fully discharged state may indicate that the battery is discharged to a preset battery level, a preset voltage, or a preset current.

Herein, the charging system 10 obtains the actual capacity of the battery 13 in each charge and discharge cycle, records a temperature, a corresponding rate, and the like of the battery, and performs conversion calculation on the actual capacity of the battery 13 based on known correspondences between different temperatures, different rates, and capacities, to further obtain a maximum capacity of the battery 13 at an actual charging temperature and charging rate. The maximum capacity is the foregoing actual capacity.

Specifically, the actual capacity of the battery 13 varies with an increase in use time or a quantity of charge and discharge cycles of the battery 13, and the actual capacity of the battery is directly related to aging of a battery core.

Therefore, an actual capacity or a discharging capacity of the battery in a previous charge and discharge cycle is used to end a charging process in a next charge and discharge cycle, which can prevent overcharge of the battery and can improve a service life of the battery.

Step S42: Obtain a state of charge of the battery at charging rates corresponding to different temperatures in an $n^{th}$ charge and discharge cycle when a constant-current charging stage ends, where the state of charge is denoted as a first state of charge $SOC_1$, and n is an integer greater than or equal to 0. The temperature herein may refer to an ambient temperature.

In an implementation, manners of obtaining the state of charge of the battery at the charging rates corresponding to the different temperatures when the constant-current charging stage ends may be based on one of the following:

(1) based on a correspondence between a voltage and a state of charge of the battery;

(2) based on a correspondence between a current and a state of charge of the battery; or (3) based on a ratio of a charging capacity in a constant-current stage to a total charging capacity. However, this implementation is not limited to the foregoing manners.

The first state of charge of the battery at the charging rates corresponding to the different temperatures when the constant-current charging stage ends may be obtained in each of the foregoing manners.

In an implementation, the correspondence between the battery voltage and the state of charge of the battery 13 is a mapping relationship established in advance between a voltage and a state of charge of the battery 13 that are collected before the battery is charged.

In an implementation, the correspondence between the current and the state of charge of the battery 13 is.

a mapping relationship established in advance between a current and a state of charge of the battery 13 that are collected before the battery is charged.

In an implementation, during charging of the battery 13, the charging system 10 may obtain the corresponding first state of charge $SOC_1$ of the battery 13 at the charging rates corresponding to the different temperatures when the constant-current charging stage ends.

Step S43: Obtain a state of charge and an ambient temperature of the battery 13 before the $m^{th}$ charge and discharge cycle.

In an implementation, the charging system 10 may obtain the second state of charge $SOC_2$ and the ambient temperature of the battery 13 before the $m^{th}$ charge and discharge cycle.

Step S44: Determine whether the second state of charge $SOC_2$ is less than the first state of charge $SOC_1$.

If the second state of charge is less than the first state of charge, step S46 is performed, otherwise step S45 is performed.

In this implementation, during charging of the battery 13, the charging system 10 compares magnitude of the first state of charge $SOC_1$ and that of the second state of charge $SOC_2$ at the same temperature.

Step S45: Constant-voltage charge the battery 13 based on a first cut-off voltage $U_m$ and a first charging capacity.

In an implementation, the charging system 10 may constant-voltage charge the battery 13 based on the first cut-off voltage $U_m$ and the first charging capacity $Q_1$, that is, $U_m=U_{c1}+b$.

In another implementation, the charging system 10 obtains a fourth cut-off voltage of the battery 13 at the same temperature in a constant-voltage charging stage in an $(m-1)^{th}$ charge and discharge cycle. In the $m^{th}$ charge and discharge cycle, the charging system 10 may constant-voltage charge the battery 13 based on the fourth cut-off voltage and the first charging capacity $Q_1$.

Specifically, the first charging capacity is denoted as $Q_1$, and $Q_1$ satisfies the following formula:

$$Q_1=(1-SOC_2) \times Q \qquad (3).$$

Herein, Q represents a current actual capacity of the battery 13.

It may be learned from this that when the second state of charge $SOC_2$ is greater than or equal to the first state of charge $SOC_1$, the charging system 10 constant-voltage charges the battery 13 by using the fourth cut-off voltage, that is, the charging capacity is the first charging capacity $Q_1$, thereby ensuring that the battery 13 is not overcharged.

Step S46: Constant-current charge the battery to the first cut-off voltage $U_m$ by using a charging current.

Specifically, in this implementation, in the $m^{th}$ charge and discharge cycle, when the second state of charge $SOC_2$ is less than the first state of charge $SOC_1$, the charging current is a charging current of the battery 13 or another battery the same as the battery 13 in the constant-current charging stage in the $n^{th}$ charge and discharge cycle, or the charging current is a preset value. The charging system 10 obtains the charging current of the battery 13 in the constant-current charging stage in the $n^{th}$ charge and discharge cycle.

The charging system 10 constant-current charges the battery 13 to the first cut-off voltage $U_m$ by using the charging current in the $m^{th}$ charge and discharge cycle.

Step S47: Constant-voltage charge the battery to a fully charged state by using the first cut-off voltage $U_m$.

Specifically, when the charging system 10 constant-current charges the battery 13 to the first cut-off voltage $U_m$ at the charging current in the $m^{th}$ charge and discharge cycle, the charging system 10 constant-voltage charges the battery 13 to the fully charged state at the first cut-off voltage Urn, to ensure that lithium precipitation does not occur on the battery 13 and an overcharge phenomenon does not occur on the battery.

In charging processes of step S46 and step S47, a total charging capacity of the battery 13 is the second charging capacity $Q_2$, where $Q_2=(1-SOC_2) \times Q$, and Q is the current actual capacity of the battery 13.

To make the objectives, technical solutions, and technical effects of this application clearer, the following further describes this application in detail with reference to the accompanying drawings and the embodiments. In a battery system used in each comparative example and each example of this application, $LiCoO_2$ is used as a cathode, graphite is used as an anode, and a separator, an electrolytic solution, and a packaging housing are also included, and the battery system is manufactured through processes such as mixing, coating, assembling, chemical conversion, and aging. Reference electrodes are added between positive electrode plates and negative electrode plates in winding processes of some battery cores, to manufacture tri-electrode batteries configured to test and compare potential differences between the cathode and the anode during charging. It should be noted that a battery of another chemical system may also be used in each comparative example and each example of this application. That is, another substantial is used as a cathode material, such as lithium manganate oxide, lithium iron phosphate, or a ternary material. This application is not limited thereto. For example, a cut-off voltage (charging limit voltage) of the battery during constant-current charging in each comparative example and each example in this application is 4.45 V. Herein, it should be noted that the charging method in this application is applicable to batteries of various voltage systems, but not limited to the 4.45 V system. Cycling performance tests are performed on a used battery core of the system in a charging method in the prior art and the charging method in this application, and charging time in constant-current stages, charging time in constant-voltage stages, and total charging time of the used battery core during charging are compared.

In the comparative examples described below, the battery is charged in the charging method in the prior art.

Comparative Example 1

It should be noted that Comparative Example 1 discloses a specific implementation process of using a fresh battery to perform the charging method in the prior art (that is, a constant-current charging stage in each charge and discharge cycle is ended at the same fixed voltage).

Ambient temperature: 25° C.

A charging process is as follows:

Step 1: The battery was charged until a battery voltage reached a 4.45 V cut-off voltage (which can be understood as a cut-off voltage for constant-current charging) by using a 1.5 C constant current.

Step 2: The battery was then charged until a battery current reached a 0.05 C cut-off current by using a 4.45 V constant voltage.

Step 3: The battery was stood for 5 minutes.

Step 4: The battery was then discharged until a battery voltage reached 3.0 V by using a 1.0 C constant current.

Step 5: The battery was stood for another 5 minutes.

Step 6: The foregoing 5 steps were repeated for 500 cycles.

It should be noted that specific examples 1 to 3 disclose specific implementation processes of using fresh batteries to obtain corresponding parameters, and charging the fresh batteries in the charging method in this application. In such process, the ambient temperature remained unchanged and was the same as that in Comparative Example 1. Herein, in Example 1, the fresh battery was a battery that had not been used after being delivered from a factory, or a battery that had been cyclically charged and discharged less than a preset quantity of times (such as 10 times or another quantity of times) after being delivered from a factory.

Example 1

(1) Setting of a parameter $U_m$ $U_m$ during a battery cycle changed based on the following rule:

$U_m = U_{c1} + b_1 \times m + b_2$, where $U_{c1}$=4.45 V, $U_{c1}$ was a cut-off voltage of the battery when a constant-current charging stage in a first charge and discharge cycle ended, $1 \leq m \leq 80$, $b_1$=0, $b_2$=0; $81 \leq m \leq 500$, $b_1$=0.0002, and $b_2$=0.

(2) A charging process is as follows:

Ambient temperature: 25° C.

Step 1: A current actual capacity Q of a battery was obtained.

Step 2: The battery was charged until a battery voltage reached a cut-off voltage $U_m$ by using a 1.5 C constant current, where $U_m$ varied with a quantity m of cycles based on a preset formula.

Step 3: The battery was then charged until a total capacity of the battery was Q by using the constant voltage $U_m$.

Step 4: The battery was stood for 5 minutes.

Step 5: The battery was then discharged until a battery voltage reached 3.0 V by using a 1.0 C constant current.

Step 6: A discharging capacity in Step 5 was obtained to obtain an actual capacity Q of the battery.

Step 7: The foregoing steps 2 to 6 were repeated for 500 cycles (that is, m was incremented from 1 to 500).

Example 2

(1) Setting of a parameter $U_m$ $U_m$ during a battery cycle changed based on the following rule:

$U_m = U_{c1} + b_1 \times m + b_2$, where $U_{c1}$=4.45 V, $1 \leq m \leq 80$, $b_1$=0, and $b_2$=0. $81 \leq M \leq 500$, $b_1$=0.0001, and $b_2$=0.01.

(2) A charging process is as follows:

The charging process was similar to that in Example 1 except that the setting of $U_m$ in Example 2 was used.

Example 3

(1) Setting of a parameter $U_m$ $U_m$ during a battery cycle changed based on the following rule:

In each cycle, $U_m$ was selected as a large one of U and $U_{c1}$, where $U = OCV_1 + (U_{c1} - OCV_1) \times k$, $U_{c1}$=4.45 V, $OCV_1$=4.10 V, $U_{c1}$ and $OCV_1$ were respectively a cut-off voltage and an open-circuit voltage of the battery when a constant-current charging stage in a first charge and discharge cycle ended, k was an impedance growth rate of the battery, actual impedance of the battery needed to be collected in real time during the battery cycle to calculate the growth rate, $k = R_2/R_1$, $R_2$ was battery impedance when SOC=50% in an $(m-1)^{th}$ charging process of the battery, $R_1$ was battery impedance of the battery when SOC=50% in the first charging process, and a value satisfied that $R_1$=60 mOhm.

(2) A charging process is as follows:

The charging process was similar to that in Example 1 except that the setting of $U_m$ in Example 3 was used.

Comparative Example 2

Comparative Example 2 was similar to Comparative Example 1 except that a battery that had been cyclically used 100 times was used to perform the charging method in the prior art.

It should be noted that in Example 4 to Example 6, fresh batteries were used to obtain corresponding parameters, in Example 7, the battery that had been cyclically used 100 times was used to obtain the corresponding parameters, and Example 4 to Example 7 disclose specific implementation processes of charging, in the charging method in this application, the battery that had been cyclically used 100 times, and the ambient temperature during charging was the same as that in Comparative Example 2 and remained unchanged.

Example 4

(1) Setting of a parameter $U_m$ $U_m$ during a battery cycle changed based on the following rule:

$U_m = U_{c1} + b_1 \times m + b_2$, where $U_{c1}$=4.45 V, $101 \leq m \leq 500$, $b_1$=0.0002, and $b_2$=0.

(2) A charging process is as follows:

The charging process was similar to that in Example 1 except that a battery that had been cyclically used 100 times was charged by using the $U_m$ set in Example 4, and m was incremented from 101 to 500.

Example 5

(1) Setting of a parameter $U_m$ $U_m$ during a battery cycle changed based on the following rule:

$U_m = U_{c1} + b_1 \times m + b_2$, where $U_{c1} = 4.45$ V, $101 \leq m \leq 500$, $b_1 = 0.0001$, and $b_2 = 0.01$.

(2) A charging process is as follows:

The charging process was similar to that in Example 1 except that a battery that had been cyclically used 100 times was charged by using the $U_m$ set in Example 5, and m was incremented from 101 to 500.

Example 6

(1) Setting of a parameter $U_m$

It should be noted that Example 6 discloses that a fresh battery is used to obtain a corresponding charging parameter.

$U_m$ during a battery cycle changed based on the following rule:

$U_m$ was selected as a large one of U and $U_{c1}$, where $U = OCV_1 \pm (U_{c1} - OCV_1) \times k$.

$U_{c1} = 4.45$ V, $OCV_1 = 4.10$ V, $OCV_1$ was an open-circuit voltage of the battery when a constant-current charging stage in a first charge and discharge cycle ended, k was an impedance growth rate of the battery, actual impedance of the battery needed to be collected real time during the battery cycle to calculate the growth rate, $k = R_2/R_1$, $R_2$ was battery impedance when the SOC was 50% in an $(m-1)^{th}$ charging process of the battery, $R_1$ was battery impedance of the battery when the SOC was 50% in the first charging process, and a value satisfied that $R_1 = 60$ mOhm.

(2) A charging process is as follows:

The charging process was similar to that in Example 3 except that a battery that had been cyclically used 100 times was charged by using the $U_m$ set in Example 6, and m was incremented from 101 to 500.

Example 7

(1) Setting of a parameter $U_m$

It should be noted that Example 7 discloses that a battery that has been cyclically used 100 times is used to obtain a corresponding charging parameter.

$U_m$ during a battery cycle changed based on the following rule:

$U_m$ was selected as a large one of U and $U_{c1}$, where $U = OCV_1 + (U_{c1} - OCV_1) \times k$.

$U_{c1} = 4.45$ V, $OCV_1 = 4.08$ V, $OCV_1$ was an open-circuit voltage of the battery when a constant-current charging stage in a $100^{th}$ charge and discharge cycle ended, k was an impedance growth rate of the battery, actual impedance of the battery needed to be collected in real time during the battery cycle to calculate the growth rate, $k = R_2/R_1$, $R_2$ was battery impedance when the SOC was 50% in an $(m-1)^{th}$ charging process of the battery, $R_1$ was battery impedance of the battery when the SOC was 50% in the $100^{th}$ charging process, and a value satisfied that $R_1 = 63$ mOhm.

(2) A charging process is as follows:

The charging process was similar to that in Example 6 except that a battery that had been cyclically used 100 times was charged by using the $U_m$ set in Example 7, and m was incremented from 101 to 500.

During the test, values of parameters (such as voltages, states of charge, currents, and charging time) of the battery at different stages in each comparative example and example were recorded, and corresponding results were recorded in the following Table 1.

TABLE 1

Ending condition of a constant-current stage and charging time of each stage in each comparative example and each example

| | Value of n | Value of m | Ending condition of a constant-current stage | | Charging time of a constant-current stage (min) | Charging time of a constant-voltage stage (min) | Total charging time (min) |
|---|---|---|---|---|---|---|---|
| | | | Voltage | SOC | | | |
| Comparative Example 1 | 1 | 2 | 4.45 V | 70.6% | 27.7 | 53.6 | 81.3 |
| | 1 | 100 | 4.45 V | 68.7% | 26.2 | 57.3 | 83.5 |
| | 1 | 200 | 4.45 V | 66.0% | 24.7 | 60.3 | 85.0 |
| | 1 | 500 | 4.45 V | 62.9% | 22.5 | 64.2 | 86.7 |
| Example 1 | 1 | 2 | 4.45 V | 70.6% | 27.7 | 53.6 | 81.3 |
| | 1 | 100 | 4.47 V | 71% | 27.2 | 35.7 | 62.9 |
| | 1 | 200 | 4.49 V | 70.6% | 26.5 | 29.9 | 56.4 |
| | 1 | 500 | 4.55 V | 71.2% | 25.4 | 22.3 | 47.7 |
| Example 2 | 1 | 2 | 4.45 V | 70.6% | 27.7 | 53.6 | 81.3 |
| | 1 | 100 | 4.47 V | 71% | 27.2 | 35.7 | 62.9 |
| | 1 | 200 | 4.48 V | 70.4% | 26.4 | 30.4 | 56.8 |
| | 1 | 500 | 4.51 V | 68.7% | 24.5 | 28.8 | 53.3 |
| Example 3 | 1 | 2 | 4.45 V | 70.6% | 27.7 | 53.6 | 81.3 |
| | 1 | 100 | 4.46 V | 70.5% | 27.0 | 37.9 | 64.9 |
| | 1 | 200 | 4.49 V | 70.8% | 26.7 | 29.1 | 55.8 |
| | 1 | 500 | 4.53 V | 70.3% | 24.8 | 24.9 | 49.7 |
| Comparative Example 2 | 100 | 102 | 4.45 V | 68.7% | 26.2 | 57.3 | 83.5 |
| | 100 | 200 | 4.45 V | 66.0% | 24.7 | 60.3 | 85.0 |
| | 100 | 300 | 4.45 V | 64.5% | 23.2 | 62.4 | 85.6 |
| | 100 | 500 | 4.45 V | 62.9% | 22.5 | 64.2 | 86.7 |
| Example 4 | 100 | 102 | 4.47 V | 71% | 27.2 | 35.7 | 62.9 |
| | 100 | 200 | 4.49 V | 70.6% | 26.5 | 29.9 | 56.4 |
| | 100 | 300 | 4.51 V | 70.8% | 26.2 | 27.1 | 53.3 |
| | 100 | 500 | 4.55 V | 71.2% | 25.4 | 22.3 | 47.7 |
| Example 5 | 100 | 102 | 4.47 V | 71% | 27.2 | 35.7 | 62.9 |
| | 100 | 200 | 4.48 V | 70.4% | 26.4 | 30.4 | 56.8 |
| | 100 | 300 | 4.49 V | 69.5% | 25.1 | 29.4 | 54.5 |
| | 100 | 500 | 4.51 V | 68.7% | 24.5 | 28.8 | 53.3 |

TABLE 1-continued

Ending condition of a constant-current stage and charging time
of each stage in each comparative example and each example

|  | Value of n | Value of m | Ending condition of a constant-current stage | | Charging time of a constant-current stage (min) | Charging time of a constant-voltage stage (min) | Total charging time (min) |
| --- | --- | --- | --- | --- | --- | --- | --- |
|  |  |  | Voltage | SOC |  |  |  |
| Example 6 | 100 | 102 | 4.46 V | 70.5% | 27.0 | 37.9 | 64.9 |
|  | 100 | 200 | 4.49 V | 70.8% | 26.7 | 29.1 | 55.8 |
|  | 100 | 300 | 4.51 V | 70.8% | 26.2 | 27.1 | 53.3 |
|  | 100 | 500 | 4.53 V | 70.3% | 24.8 | 24.9 | 49.7 |
| Example 7 | 100 | 102 | 4.46 V | 70.5% | 27.0 | 37.9 | 64.9 |
|  | 100 | 200 | 4.49 V | 70.8% | 26.7 | 29.1 | 55.8 |
|  | 100 | 300 | 4.51 V | 70.8% | 26.2 | 27.1 | 53.3 |
|  | 100 | 500 | 4.53 V | 70.3% | 24.8 | 24.9 | 49.7 |

It may be learned from the foregoing table that in the charging methods in Comparative Examples 1 and 2, as the battery was cyclically used, the battery impedance gradually increased, constant-current charging time of the battery was shortened, constant-voltage charging time was prolonged, and total charging time was prolonged. Compared with Comparative Examples 1 and 2, in Examples 1 to 3 and Examples 4 to 7 in which the charging method in this application that was used, constant-current charging time can be prolonged, constant-voltage charging time was greatly reduced, thereby greatly reducing fully charged time of the battery. A charging speed was obviously faster than a charging speed in Comparative Examples 1 and 2.

When the battery was charged in the charging method in each example of this application, because a cut-off voltage of a constant-current charging stage in each charge and discharge cycle was greater than a corresponding cut-off voltage in the prior art, fully charged time in the charging method in this application was shorter than time required for the charging method in the prior art.

Figure 5:
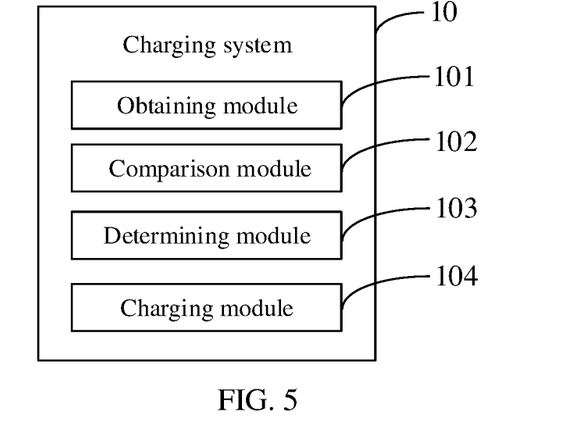
FIG. 5 is a module diagram of a charging system according to an implementation of this application.

Referring to FIG. 5, in this implementation, a charging system 10 may be divided into one or more modules, and the one or more modules are stored in a processor 11 and are performed by the processor 11 to complete this application. The one or more modules may be a series of computer program instruction segments capable of completing specific functions, and the instruction segments are used to describe an execution process of the charging system 10 in the electronic apparatus 100. For example, the charging system 10 may be divided into an obtaining module 101, a comparison module 102, a determining module 103, and a charging module 104 in FIG. 5.

The obtaining module 101 is configured to obtain a first state of charge of the battery at charging rates corresponding to different temperatures in an $n^{th}$ charge and discharge cycle when a constant-current charging stage ends.

The obtaining module 101 is further configured to obtain first battery impedance of the battery in the $n^{th}$ charge and discharge cycle.

The obtaining module 101 is further configured to obtain second battery impedance of the battery in an $(m-1)^{th}$ charge and discharge cycle and obtain a second state of charge of the battery before charging in an $m^{th}$ charge and discharge cycle.

The obtaining module 101 is further configured to obtain an open-circuit voltage and a second cut-off voltage of the battery when the constant-current charging stage in the $n^{th}$ charge and discharge cycle ends.

The comparison module 102 is configured to compare magnitude of the first state of charge and that of the second state of charge at a same temperature.

The determining module 103 is configured to determine an impedance growth rate of the battery based on the first battery impedance and the second battery impedance.

The obtaining module 101 is further configured to obtain, based on the open-circuit voltage, the impedance growth rate, and the second cut-off voltage, a third cut-off voltage of the battery in a constant-current charging stage in the $m^{th}$ charge and discharge cycle.

The determining module 103 is further configured to determine a charging manner of the battery 13 based on a comparison result.

The comparison module 102 is further configured to compare magnitude of the third cut-off voltage and that of the second cut-off voltage.

The charging module 104 is configured to constant-current charge the battery 13 until a voltage of the battery 13 reaches a cut-off voltage or a cut-off capacity.

The charging module 104 is further configured to constant-voltage charge the battery 13 until a current of the battery 13 reaches a cut-off current or a cut-off capacity.

The charging system 10 can perform charging management on the battery 13, to improve charging efficiency, a service life, and reliability of the battery. For details, refer to the embodiments of the foregoing method of charging a battery. Details are not described herein again.

In an implementation, the processor 11 may be a central processing unit (CPU), or may be another general-purpose processor, a digital signal processor (DSP), an application specific integrated circuit (ASIC), a field-programmable gate array (FPGA) or another programmable logic device, a discrete gate or transistor logic device, a discrete hardware component, or the like. The general-purpose processor may be a microprocessor, or the processor 11 may be any other conventional processor or the like.

When the module in the charging system 10 is implemented in a form of a software functional unit and sold or used as an independent product, the module may be stored in a computer-readable storage medium. Based on such understanding, some or all of the processes for implementing the methods in the embodiments of this application may be completed by related hardware instructed by a computer program. The computer program may be stored in a computer-readable storage medium. When the computer program is executed by the processor, the steps of the foregoing method embodiments are implemented. The computer program includes computer program code, and the computer program code may be in a form of source code, object code, or an executable file, some intermediate forms, or the like. The computer-readable medium may include: any entity or apparatus capable of carrying the computer program code, a recording medium, a USB flash drive, a removable hard disk, a magnetic disk, an optical disc, a computer memory, a read-only memory (ROM), a random access memory (RAM), an electrical carrier signal, a telecommunications signal, a software distribution medium, or the like. It should be noted that the content included in the computer-readable medium may be appropriately added or deleted according to requirements of legislation and patent practices in a jurisdiction. For example, in some jurisdictions, according to legislation and patent practices, the computer-readable medium does not include an electrical carrier signal or a telecommunication signal.

It may be understood that division of modules described above is division of logical functions. Other division manners may be available in actual implementations. In addition, function modules in the embodiments of this application may be integrated into a same processing unit, or each of the modules may exist alone physically, or two or more modules are integrated into a same unit. The integrated module may be implemented in a form of hardware, or may be implemented in a form of hardware and a software functional module.

In another implementation, the electronic apparatus 100 may further include a memory (not shown in the figure), and the one or more modules may also be stored in the memory and executed by the processor 11. The memory may be an internal memory of the electronic apparatus 100, that is, a memory built in the electronic apparatus 100. In another embodiment, the memory may also be an external memory of the electronic apparatus 100, that is, a memory externally connected to the electronic apparatus 100.

In some embodiments, the memory is configured to store program code and various data, for example, program code of the charging system 10 installed in the electronic apparatus 100, and complete automatic high-speed access of the program and the data during operation of the electronic apparatus 100.

The memory may include a random access memory, or may further include a non-volatile memory, for example, a hard disk, a memory, a plug-connected hard disk, a smart media card (SMC), a secure digital (SD) card, a flash card, at least one magnetic disk storage device, a flash storage device, or other volatile solid-state storage devices.

For a person skilled in the art, obviously, this application is not limited to the details of the foregoing example embodiments, and this application may be implemented in other specific forms without departing from the spirit or basic attributes of this application. Therefore, viewed from any perspective, the foregoing embodiments of this application should be considered to be an example and non-restrictiveness. The scope of this application is defined by the appended claims other than the foregoing descriptions, and therefore, all changes intended to fall within the meanings and the scope of the equivalent important documents of the claims are covered in this application.

The invention claimed is:

1. A method of charging a battery, comprising:
in an $m^{th}$ charge and discharge cycle, constant-current charging a battery to a first cut-off voltage $U_m$ at a charging current, wherein m is any two or more integers of 1, 2, 3, . . . , x, and $U_m$ has different values in at least two charge and discharge cycles;
wherein $U_m = U_{c1} + b$, $0 < b \leq 0.5$; $U_{c1}$ is a second cut-off voltage, $U_{c1}$ is a cut-off voltage of the battery or another battery same as the battery when a constant-current charging stage in an $n^{th}$ charge and discharge cycle ends, or $U_{c1}$ is a charging limit voltage of the battery or the another battery or a preset value; n is an integer greater than or equal to 0, m is greater than n, and b has different values in at least two charge and discharge cycles.

2. The method according to claim 1, wherein $b = b_1 \times m + b_2$, wherein $0 \leq b_1 \leq 0.0005$, and $0 \leq b_2 \leq 0.1$.

3. The method according to claim 1, wherein the first cut-off voltage $U_m$ is obtained in the following manner:
selecting a larger one of the second cut-off voltage $U_{c1}$ and a third cut-off voltage U as the first cut-off voltage $U_m$, wherein the third cut-off voltage satisfies that $U = OCV_1 + (U_{c1} - OCV_1) \times k$, $OCV_1$ is an open-circuit voltage of the battery or another battery when a constant-current charging stage in an $n^{th}$ charge and discharge cycle ends, and k is an impedance growth rate of the battery or the another battery.

4. The method according to claim 3, wherein the open-circuit voltage $OCV_1$ and the second cut-off voltage $U_{c1}$ are obtained through the following steps:
obtaining a correspondence between an open-circuit voltage and a state of charge of the battery and a correspondence between a voltage and a state of charge of the battery; and
based on the correspondence between the open-circuit voltage and the state of charge of the battery and the correspondence between the voltage and the state of charge of the battery, obtaining the open-circuit voltage $OCV_1$ and the second cut-off voltage $U_{c1}$ of the battery when the constant-current charging stage in the $n^{th}$ charge and discharge cycle ends.

5. The method according to claim 3, wherein the impedance growth rate k is obtained through the following steps:
obtaining first battery impedance $R_1$ of the battery in the $n^{th}$ charge and discharge cycle; and
obtaining second battery impedance $R_2$ of the battery in an $(m-1)^{th}$ charge and discharge cycle, wherein $k = R_2 / R_1$.

6. The method according to claim 1, further comprising:
comparing magnitude of a first state of charge $SOC_1$ and that of a second state of charge $SOC_2$;
wherein the $SOC_1$ is a state of charge of the battery when a constant-current charging stage in an $n^{th}$ charge and discharge cycle ends, and the $SOC_2$ is a state of charge of the battery before the $m^{th}$ charge and discharge cycle.

7. The method according to claim 6, further comprising:
in the $m^{th}$ charge and discharge cycle, when the second state of charge $SOC_2$ is greater than or equal to the first state of charge $SOC_1$, constant-voltage charging the battery based on the first cut-off voltage $U_m$ and a first charging capacity $Q_1$, wherein $Q_1 = (1 - SOC_2) \times Q$, and Q represents a current actual capacity of the battery.

8. The method according to claim 6, further comprising:
in the $m^{th}$ charge and discharge cycle, when the second state of charge $SOC_2$ is greater than or equal to the first state of charge $SOC_1$, obtaining a fourth cut-off voltage of the battery in a constant-voltage charging stage in an $(m-1)^{th}$ charge and discharge cycle; and
constant-voltage charging the battery based on the fourth cut-off voltage and a first charging capacity $Q_1$, wherein $Q_1 = (1 - SOC_2) \times Q$, and Q is a current actual capacity of the battery.

9. The method according to claim 6, further comprising:
in the $m^{th}$ charge and discharge cycle, when the second state of charge $SOC_2$ is less than the first state of charge $SOC_1$, constant-current charging the battery to the first cut-off voltage $U_m$ at the charging current, wherein the charging current is a charging current of the battery or another battery same as the battery in the constant-current charging stage in the $n^{th}$ charge and discharge cycle, or the charging current is a preset value; and constant-voltage charging the battery to a fully charged state at the first cut-off voltage $U_m$, wherein a total charging capacity of the battery reaching the fully charged state is a second charging capacity $Q_2$, wherein $Q_2=(1-SOC_2)\times Q$, and Q is a current actual capacity of the battery.

10. An electronic apparatus, comprising:
   a battery; and
   a processor configured to perform the method of charging a battery, the method comprising:
   in an $m^{th}$ charge and discharge cycle, constant-current charging a battery to a first cut-off voltage $U_m$ at a charging current, wherein m is any two or more integers of 1, 2, 3, . . . , x, and $U_m$ has different values in at least two charge and discharge cycles;
   wherein $U_m=U_{c1}+b$, $0<b\leq 0.5$; $U_{c1}$ is a second cut-off voltage, $U_{c1}$ is a cut-off voltage of the battery or another battery same as the battery when a constant-current charging stage in an $n^{th}$ charge and discharge cycle ends, or $U_{c1}$ is a charging limit voltage of the battery or the another battery or a preset value; n is an integer greater than or equal to 0, m is greater than n, and b has different values in at least two charge and discharge cycles.

11. The electronic apparatus according to claim 10, wherein $b=b_1\times m+b_2$, wherein $0\leq b_1\leq 0.0005$, and $0\leq b_2\leq 0.1$.

12. The electronic apparatus according to claim 10, wherein the first cut-off voltage $U_m$ is obtained in the following manner:
   selecting a larger one of the second cut-off voltage $U_{c1}$ and a third cut-off voltage U as the first cut-off voltage $U_m$, wherein the third cut-off voltage satisfies that $U=OCV_1+(U_{c1}-OCV_1)\times k$, $OCV_1$ is an open-circuit voltage of the battery or another battery when a constant-current charging stage in an $n^{th}$ charge and discharge cycle ends, and k is an impedance growth rate of the battery or the another battery.

13. The electronic apparatus according to claim 12, wherein the open-circuit voltage $OCV_1$ and the second cut-off voltage $U_{c1}$ are obtained through the following steps:
   obtaining a correspondence between an open-circuit voltage and a state of charge of the battery and a correspondence between a voltage and a state of charge of the battery; and
   based on the correspondence between the open-circuit voltage and the state of charge of the battery and the correspondence between the voltage and the state of charge of the battery, obtaining the open-circuit voltage $OCV_1$ and the second cut-off voltage $U_{c1}$ of the battery when the constant-current charging stage in the $n^{th}$ charge and discharge cycle ends.

14. The electronic apparatus according to claim 12, wherein the impedance growth rate k is obtained through the following steps:
   obtaining first battery impedance $R_1$ of the battery in the $n^{th}$ charge and discharge cycle; and
   obtaining second battery impedance $R_2$ of the battery in an $(m-1)^{th}$ charge and discharge cycle, wherein $k=R_2/R_1$.

15. The electronic apparatus according to claim 10, further comprising:
   comparing magnitude of a first state of charge $SOC_1$ and that of a second state of charge $SOC_2$;
   wherein the $SOC_1$ is a state of charge of the battery when a constant-current charging stage in an $n^{th}$ charge and discharge cycle ends, and the $SOC_2$ is a state of charge of the battery before the $m^{th}$ charge and discharge cycle.

16. The electronic apparatus according to claim 15, further comprising:
   in the $m^{th}$ charge and discharge cycle, when the second state of charge $SOC_2$ is greater than or equal to the first state of charge $SOC_1$, constant-voltage charging the battery based on the first cut-off voltage $U_m$ and a first charging capacity $Q_1$, wherein $Q_1=(1-SOC_2)\times Q$, and Q is a current actual capacity of the battery.

17. The electronic apparatus according to claim 15, further comprising:
   in the $m^{th}$ charge and discharge cycle, when the second state of charge $SOC_2$ is greater than or equal to the first state of charge $SOC_1$, obtaining a fourth cut-off voltage of the battery in a constant-voltage charging stage in an $(m-1)^{th}$ charge and discharge cycle; and
   constant-voltage charging the battery based on the fourth cut-off voltage and a first charging capacity $Q_1$, wherein $Q_1=(1-SOC_2)\times Q$, and Q represents a current actual capacity of the battery.

18. A non-transitory storage medium, storing at least one computer instruction, wherein the instruction is loaded by a processor and is used to perform the method of charging a battery, the method comprising:
   in an $m^{th}$ charge and discharge cycle, constant-current charging a battery to a first cut-off voltage $U_m$ at a charging current, wherein m is any two or more integers of 1, 2, 3, . . . , x, and $U_m$ has different values in at least two charge and discharge cycles;
   wherein $U_m=U_{c1}+b$, $0<b\leq 0.5$; $U_{c1}$ is a second cut-off voltage, $U_{c1}$ is a cut-off voltage of the battery or another battery same as the battery when a constant-current charging stage in an $n^{th}$ charge and discharge cycle ends, or $U_{c1}$ is a charging limit voltage of the battery or the another battery or a preset value; n is an integer greater than or equal to 0, m is greater than n, and b has different values in at least two charge and discharge cycles.

* * * * *